UNITED STATES PATENT OFFICE 2,024,368

MONOAZO DYES AND THEIR PRODUCTION

Henry Jordan and Miles Augustinus Dahlen, Wilmington, Del., assignors to E. I. du Pont de Nemours & Company, Wilmington, Del., a corporation of Delaware No Drawing. Application March 23, 1932,
Serial No. 600,821

18 Claims. (Cl. 260—96)

This invention relates to organic compounds and more particularly refers to azo dyes, especially monoazo dyes adapted for dyeing cellulose esters.

The object of this invention is the production of new chemical compounds. Further objects are the production of new azo dyes; the production of new azo dyes having an exceptional affinity for cellulose esters; the production of new azo dyes which may be readily diazotized and developed on the fibre; the production of new azo dyes which may be discharged, with a proper reducing discharge medium, to a pure white. Additional objects will appear hereinafter.

These objects are accomplished by means of the present invention whereby a diazo compound of a base of the following general formula:

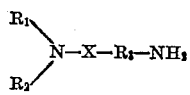

in which $R_1$ and $R_2$ mean hydrogen or an alkyl group, X means CO or $SO_2$, and $R_3$ means a benzene radical which may have substituents attached to the nucleus thereof but which does not contain a free sulfo or carboxyl group, is coupled to an amine of the benzene or naphthalene series having a free para position to the amino group and which may have substituents attached thereto but which does not contain a free sulfo or carboxyl group. The new dye formed by this coupling will most probably have the following formula:

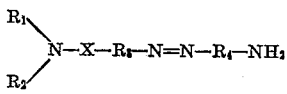

in which $R_4$ is an aromatic radical of the benzene or naphthalene series which may have substituents attached thereto but which does not contain a free sulfo or carboxyl group.

The invention will be more completely understood by reference to the following examples:

Example I

One hundred sixty-four (164) parts of p-amino-dimethyl-benzamide were dissolved in 2000 parts of water and 280 parts of a 31% hydrochloric acid solution and diazotized at 10–15° C. with 69 parts of sodium nitrite. To the diazo solution there was added a solution of 107 parts m-toluidine in 1500 parts of water and 135 parts of a 31% hydrochloric acid solution. The mineral acidity was neutralized with sodium acetate and the coupling was allowed to stir at 15–20° C. for 10–12 hours when it was found to be completed. It was then made acid to Congo red paper again with hydrochloric acid, precipitated completely with salt, and filtered. The dye was soluble in acidified water with an orange coloration (as acids there may be used hydrochloric, sulfuric, oxalic acid, etc.). It dyed acetyl cellulose in bright yellow shades which on diazotizing on the fibre and developing with beta-naphthol yielded a bright scarlet; with beta-hydroxy-naphthoic acid a bright Bordeaux shade. The dyeings were fast to washing and to light and discharged to a pure white with a proper reducing discharge medium.

The new dye most probably has the following formula:

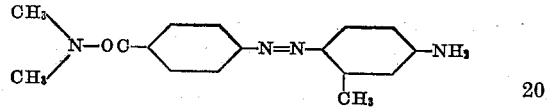

since on reduction with stannous chloride it yielded p-amino-dimethyl-benzamide and 2,5-diamino-toluene.

Example II

Replacing in Example I the 107 parts of m-toluidine by 137 parts of cresidine:

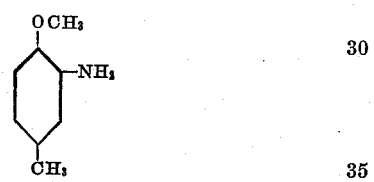

leaving all other conditions and reactants the same, a dye was obtained which was soluble in acidified water with a bright orange coloration, dyeing acetyl cellulose in bright yellowish-orange shades, which on diazotizing on the fibre and developing with beta-naphthol yielded a bluish-red; with beta-hydroxy-naphthoic acid a bright bluish violet. The dyeings were fast to washing and to light and gave a white discharge with a proper reducing discharge medium. The new dye has most probably the following formula:

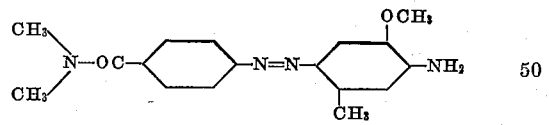

since on reduction with stannous chloride it yielded p-amino-dimethyl-benzamide and 1-methoxy-4-methyl-2,5-diamino-benzene.

Example III

One hundred seventy-two (172) parts of aniline-para-sulfonamide were dissolved with 2000 parts of water and 280 parts of 31% hydrochloric acid solution and, after cooling to about 15° C., the solution was diazotized with 69 parts of sodium nitrite in the usual way. The diazo solution was then added to a solution of 209 parts of the sodium salt of aniline-omega-methane-sulfonic acid, to which had been added 280 parts of sodium acetate. After 3–4 hours stirring at 20–25° C. the coupling was found to be complete. In order to hydrolyze the omega-methane-sulfonic acid group the coupling was heated to 80–85° C., acidified with hydrochloric acid and, after stirring for 20–30 minutes at 80–85° C., the hydrolyzed dye was salted out and filtered. It was soluble in acidified water with a yellow coloration. It dyed acetyl cellulose in bright greenish-yellow shades which, after diazotization on the fibre and development with beta-naphthol, yielded a bright yellowish-scarlet; with beta-hydroxy-naphthoic acid a bright wine-red. The dyeings were fast to washing and to light and gave a white discharge with a proper reducing discharge medium.

The new dye will most probably have the following formula:

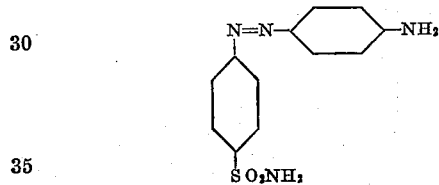

since on reduction with stannous chloride it yielded aniline-p-sulfonamide and paraphenylenediamine.

Example IV

One hundred thirty-six (136) parts of p-amino-benzamide were dissolved in 2000 parts of water and 280 parts of 31% hydrochloric acid solution and diazotized at 10–15° C. with 69 parts of sodium nitrite. To the diazo solution there was added a solution of 107 parts m-toluidine in 1500 parts of water and 135 parts of a 31% hydrochloric acid solution. The mineral acidity was neutralized with sodium acetate and the coupling was allowed to stir at 15–20° C. for 10–12 hours when it was found to be completed. It was then made acid to Congo red paper again with hydrochloric acid, precipitated completely with salt, and filtered. The dye was soluble in acidified water with an orange coloration (as acids there may be used hydrochloric, sulfuric, oxalic acid, etc.). It dyed acetyl cellulose in bright yellow shades which on diazotizing on the fibre and developing with beta-naphthol yielded a bright scarlet; with beta-hydroxy-naphthoic acid a bright Bordeaux shade. The dyeings were fast to washing and to light and discharged to a pure white with a proper reducing discharge medium.

The new dye most probably has the following formula:

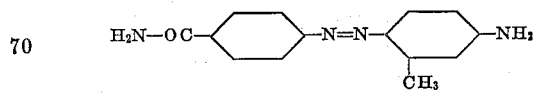

since on reduction with stannous chloride it yielded p-amino-benzamide and 2,5-diamino-toluene.

Example V

In Example IV the 107 parts of m-toluidine were substituted by 143 parts of alpha-naphthylamine, leaving all other conditions and reactants the same, a dye was obtained which was soluble in acidified water with a Bordeaux coloration, dyeing acetyl cellulose in deep orange-brown shades which on diazotizing on the fibre and developing with beta-naphthol yielded a bluish-Bordeaux; with beta-hydroxy-naphthoic acid a deep navy blue. The dyeings had properties similar to those described in Examples I and II.

The new dye has most probably the following formula:

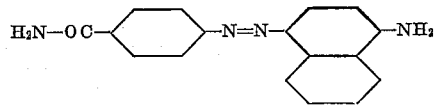

since on reduction with stannous chloride it yielded p-amino-benzamide and 1:4-naphthylene-diamine.

As previously stated, the radicals represented by $R_3$ and $R_4$ may have substituted thereon various groups but must not contain the sulfo or carboxyl group. The group substituted thereon may be alkyl, alkoxy, amino, hydroxy, and similar groups. Very good results have been obtained by substituting thereon methyl, methoxy, amino, and hydroxy groups, although it is to be understood that we do not confine ourselves to these groups but may use various other well known groups.

In place of the p-amino-benzamide and p-amino-dimethyl-benzamide there may be used, in the above examples, with very satisfactory results: p-amino-diethyl- or dibutyl-benzamide, p-amino-monomethyl-benzamide, as well as the monethyl and monobutyl compounds. The corresponding meta-amino compounds may also be substituted for any of the benzamides heretofore referred to. In Example III, in place of the aniline-para-sulfonamide, the mono- or dialkyl compounds may be used, yielding similar bright fast colors. Also other sulfonamides and alkyl-sulfonamides of the benzene series may be used, such as: aniline-m-sulfonamide, aniline-p-sulfon-dimethyl-amide, p-toluidine-o-sulfonamide, p-toluidine-o-sulfon dimethylamide, o-toluidine-p-sulfonamide, o-toluidine - p - sulfondimethyl-amide, o-anisidine-p-sulfonamide, o-anisidine-p-sulfondimethylamide, etc.

While any of the coupling components falling within the general formula above given may be used and while these components may have substituted thereon any of the groups mentioned, very satisfactory products have been obtained by using ortho toluidine, ortho anisidine, meta-anisidine, 1-methoxy-3-amino-4-methyl-benzene, p-xylidine, 1-amino-2-naphthol-methyl-ether, 1-amino-5-naphthol-methylether, 1-amino-7-naphthol-methyl-ether, 1:7-amino-naphthol, etc.

The dyestuffs produced by the process of this invention have an exceptional affinity for cellulose esters which may be dyed from an acid bath. They are highly soluble in the form of their acid salts and consequently may be made into a solution of given strength in much less time than is ordinarily required. Since they have a free amino group they may be diazotized and developed on the fibre resulting in beautiful uniform shades which may be easily discharged, by means of a suitable discharge medium, to a pure white. Due to their exceptional affinity for cellulose esters, the shades produced by the process of this invention are exceedingly fast to washing, and retain their beautiful original shades after repeated washings.

As many apparently widely different embodiments of this invention may be made without departing from the spirit and scope thereof, it is to be understood that we do not limit ourselves to the specific embodiments thereof except as defined in the appended claims.

We claim:

1. A process for producing water-insoluble monoazo dyestuffs which comprises diazotizing an amine having the following general formula:

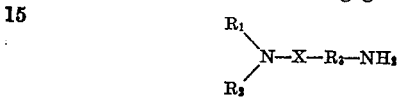

wherein $R_1$ and $R_2$ represent hydrogen or alkyl groups when X represents CO, and $R_1$ represents an alkyl group and $R_2$ represents hydrogen or an alkyl group when X represents $SO_2$, and $R_3$ represents a phenylene radical, and coupling it with an amine of the benzene or naphthalene series having a free para position to the amino group.

2. A process for producing water-insoluble monoazo dyestuffs which comprises diazotizing an amine having the following general formula:

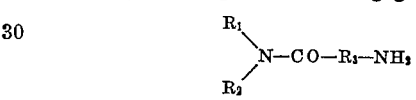

wherein $R_1$ and $R_2$ represent hydrogen or alkyl groups, and $R_3$ represents a phenylene radical, and coupling it with an amine of the benzene or naphthalene series having a free para position to the amino group.

3. The process of claim 2 wherein the phenylene radical of the diazo base and the coupling component may have substituted thereon members selected from the class consisting of alkyl and alkoxy groups.

4. A process for producing water-insoluble monoazo dyestuffs which comprises diazotizing an amine having the following general formula:

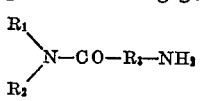

wherein $R_1$ and $R_2$ represent hydrogen or alkyl groups, and $R_3$ represents a phenylene radical, the amido group being substituted in the meta or para position to the amino group, and coupling it with an amine of the benzene or naphthalene series having a free para position to the amino group.

5. The process of claim 4 wherein the phenylene radical of the diazo base and the coupling component may have substituted thereon members selected from the class consisting of alkyl and alkoxy groups.

6. A process for producing water-insoluble monoazo dyestuffs which comprises diazotizing an amine having the following general formula:

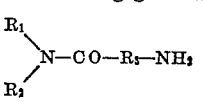

wherein $R_1$ and $R_2$ represent hydrogen or alkyl groups, and $R_3$ represents a phenylene radical, the amido group being substituted in the para position to the amino group, and coupling it with an amine of the benzene or naphthalene series having a free para position to the amino group.

7. The process of claim 6 wherein the phenylene radical of the diazo base and the coupling component may have substituted thereon members selected from the class consisting of alkyl and alkoxy groups.

8. A process for producing a monoazo dyestuff which comprises coupling diazotized para-aminodimethyl-benzamide with m-toluidine.

9. A process for producing a monoazo dyestuff which comprises coupling diazotized para-aminodimethyl-benzamide with cresidine.

10. Water-insoluble azo dyes having the following general formula:

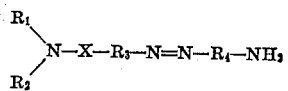

wherein $R_1$ and $R_2$ represent hydrogen or alkyl groups when X represents CO, and $R_1$ represents an alkyl group and $R_2$ represents hydrogen or an alkyl group when X represents $SO_2$, $R_3$ represents a phenylene radical, and $R_4$ represents the radical of an amine of the benzene or naphthalene series, the amino group being substituted thereon in the para position to the azo group.

11. Water-insoluble azo dyes having the following general formula:

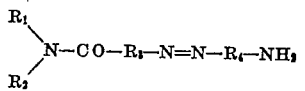

wherein $R_1$ and $R_2$ represent hydrogen or alkyl groups, $R_3$ represents a phenylene radical, and $R_4$ represents the radical of an amine of the benzene or naphthalene series, the amino group being substituted thereon in the para position to the azo group.

12. The products of claim 11 wherein the components represented by $R_3$ and $R_4$ may have substituted thereon members selected from the class consisting of alkyl and alkoxy groups.

13. Water-insoluble azo dyes having the following general formula:

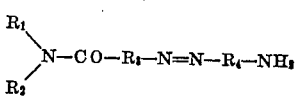

wherein $R_1$ and $R_2$ represent hydrogen or alkyl groups, $R_3$ represents a phenylene radical, the amido group being substituted thereon in the meta or para position to the amino group, and $R_4$ represents the residue of an amine of the benzene or naphthalene series, the amino group being substituted thereon in the para position to the azo group.

14. The products of claim 13 wherein the components represented by $R_3$ and $R_4$ may have substituted thereon members selected from the class consisting of alkyl and alkoxy groups.

15. Water-insoluble azo dyes having the following general formula:

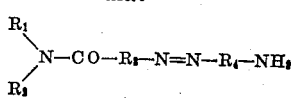

wherein $R_1$ and $R_2$ represent hydrogen or alkyl groups, $R_3$ represents a phenylene radical, the amido group being substituted thereon in the para position to the azo group, and $R_4$ represents the residue of an amine of the benzene or naphthalene series, the amino group being substituted thereon in the para position to the azo group.

16. The products of claim 15 wherein the components represented by R₃ and R₄ may have substituted thereon members selected from the class consisting of alkyl and alkoxy groups.

17. An azo dye having the following formula:

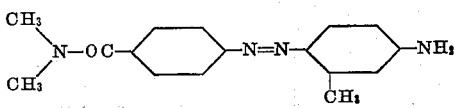

which is soluble in acidified water and dyes acetyl cellulose in bright yellow shades.

18. An azo dye having the following formula:

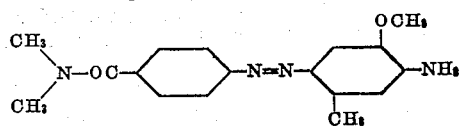

which is soluble in acidified water and dyes acetyl cellulose in bright yellowish-orange shades.

HENRY JORDAN.
MILES AUGUSTINUS DAHLEN.